United States Patent [19]

Famili et al.

[11] Patent Number: 5,206,278

[45] Date of Patent: Apr. 27, 1993

[54] EXTRUDABLE POLYVINYL ALCOHOL COMPOSITIONS CONTAINING THERMOPLASTIC POLYETHYLENE OXIDE

[75] Inventors: Amir Famili, Schnecksville; Finn L. Marten, Macungie; James F. Nangeroni, Allentown, all of Pa.

[73] Assignee: Air Products and Chemicals, Inc., Allentown, Pa.

[21] Appl. No.: 779,218

[22] Filed: Oct. 18, 1991

[51] Int. Cl.$^5$ .......................... C08K 5/06; C08L 29/04
[52] U.S. Cl. ................................... 524/377; 524/378; 524/503; 524/803
[58] Field of Search ............... 524/296, 297, 377, 378, 524/503, 803

[56] References Cited

U.S. PATENT DOCUMENTS

| | | | |
|---|---|---|---|
| 3,385,815 | 5/1968 | Yoshitake et al. | 524/378 |
| 3,441,547 | 4/1969 | Lindemann et al. | 260/85.7 |
| 3,505,303 | 4/1970 | Lindemann | 260/91.3 |
| 3,510,542 | 5/1970 | Strand | 524/503 |
| 3,695,989 | 10/1972 | Albert | 161/160 |
| 3,997,489 | 12/1976 | Coker | 524/503 |
| 4,481,326 | 11/1984 | Sonenstein | 524/377 |
| 4,529,666 | 7/1985 | Salzburg et al. | 524/503 |
| 4,611,019 | 9/1986 | Lutzmann et al. | 524/503 |
| 4,640,946 | 2/1987 | Vassallo et al. | 524/378 |
| 4,692,494 | 9/1987 | Sonenstein | 525/57 |
| 4,747,976 | 5/1988 | Yang | 252/90 |
| 5,051,222 | 10/1991 | Marten et al. | 264/143 |

Primary Examiner—Paul R. Michl
Assistant Examiner—LaVonda R. DeWitt
Attorney, Agent, or Firm—Michael Leach; James C. Simmons; William F. Marsh

[57] ABSTRACT

An extrudable polyvinyl alcohol composition useful for packaging and molding applications is prepared by melt blending polyvinyl alcohol and thermoplastic polyethylene oxide to provide a product which has improved pH stability and salt solution solubility. Useful extruded articles prepared from such compositions include films and containers.

A method for extruding the polyvinyl alcohol composition comprises:
adding sufficient energy to the polyvinyl alcohol composition to both melt it and essentially eliminate the polyvinyl alcohol crystallinity in the melt, and
simultaneously removing energy from the melt at a rate sufficient to avoid decomposition of the polyvinyl alcohol.

The thermoplastic polyethylene oxide may be added to the polyvinyl alcohol before the polyvinyl alcohol is melted and its crystallinity eliminated or blended with the thus thermally treated polyvinyl alcohol and then melt extruding the polyvinyl alcohol/polyethylene oxide blend.

21 Claims, No Drawings

EXTRUDABLE POLYVINYL ALCOHOL COMPOSITIONS CONTAINING THERMOPLASTIC POLYETHYLENE OXIDE

FIELD OF THE INVENTION

The present invention relates to melt extrudable polyvinyl alcohol compositions which have desirable physical properties.

BACKGROUND OF THE INVENTION

Polyvinyl alcohol (PVOH) is a water soluble, biodegradable resin with excellent aroma and oxygen barrier properties and resistance to most organic solvents. Other desirable attributes of PVOH include anti-static properties, grease and oil resistance and heat sealability. The polymer is used extensively in adhesive, textile sizing and paper coatings. However, the end uses of PVOH have been limited despite its excellent chemical, mechanical and physical properties to those uses in which it is supplied as a solution in water. This limitation is partly due to the fact that vinyl alcohol polymers in the unplasticized state have a high degree of crystallinity and show little or no thermoplasticity before the occurrence of decomposition which starts at about 170° C. and becomes pronounced at 200° C., which is below its crystalline melting point.

U.S. Pat. No. 5,051,222 discloses a method for making thermoplastic (melt extrudable) PVOH compositions which comprises providing sufficient energy to a PVOH which is at least partially crystalline to both melt the PVOH and substantially eliminate the crystallinity in the PVOH melt while simultaneously removing energy from the PVOH melt at a rate sufficient to avoid decomposition of the PVOH. The melt is then extruded, preferably into a strand, rapidly cooled and cut into pellets for subsequent thermoprocessing into the desired product or article.

As a result of the availability of such thermoplastic PVOH compositions, the desirable physical and mechanical properties of PVOH combined with thermoplasticity have opened new market opportunities for PVOH, especially in packaging applications where the contents must be dissolved or dispersed in water. Examples of such packaging applications for these PVOH materials include pesticides which are applied as a water spray, caustic cleaners or detergents which are dissolved during use, and process chemicals such as pigments, dyes or carbon black which are dissolved or dispersed in water. The advantages of using a water soluble film for packaging the above materials include the following:

elimination of human exposure to highly toxic or concentrated chemicals;
improvement in measuring accuracy; and
elimination of the need to clean and discard toxic chemical containers after use.

While there are water soluble PVOH films available for packaging these materials, they typically have at least one deficiency. First, the commercially available PVOH films lack the alkaline stability necessary for packaging caustic cleaning products. Normally, the partially hydrolyzed PVOH resin is used to produce a cold water soluble film for packaging alkaline products. However, the partially hydrolyzed PVOH in contact with alkaline materials will undergo further hydrolysis reaction to produce a fully hydrolyzed PVOH film. This fully hydrolyzed PVOH film becomes cold water insoluble due to an increase in the overall degree of hydrolysis. In addition, the fully hydrolyzed PVOH film is highly crystalline. This crystallinity causes the film to be more brittle and susceptible to cracking at low humidity which may result in an accidental spill of the chemicals if the package is broken.

A second drawback of PVOH resin is salt solution insolubility. The PVOH resin has a slower rate of solubility in salt water containing low levels of mono- or divalent salts and will precipitate out of solution at salt concentration over 10 wt %. This shortcoming limits the end use of PVOH packaging additives that need to be delivered to brackish media, as in the case of additives for oil drilling or related industries.

Many attempts have been reported in the literature to overcome some, but not all of the above mentioned shortcomings. U.S. Pat. Nos. 3,441,547; 3,505,303 and 4,747,976 discuss modifications or copolymerization of PVOH to produce a pH stable product. Other approaches have been through the blending of PVOH with other water soluble polymers to overcome the shortcomings of PVOH resins. These approaches are disclosed in U.S. Pat. Nos. 2,850,741; 3,695,989; 4,692,494 and 4,481,326.

SUMMARY OF THE INVENTION

The present invention provides a PVOH composition containing a polymer comprising polymerized units of ethylene oxide (EO), especially a poly(ethyleneoxy) ethanol (PEO), which composition is readily melt extrudable and provides extruded articles demonstrating improved p stability and salt solution solubility. For purposes of this invention "PEO" is also meant to include any polymer containing at least 40 wt % polymerized EO units.

Also provided is a process for the production of such extrudable PVOH/PEO compositions in the form of essentially gel-free thermoplastic pellets useful for conventional thermoplastic processing.

The extrudable PVOH/PEO composition consists essentially of:
a) 5 to 95 wt % PVOH,
b) 5 to 95 wt % thermoplastic PEO; and
c) 1 to 30 wt % plasticizer, based on PVOH.

The extrudable PVOH/PEO composition is obtained by providing sufficient energy to a PVOH which is at least partially crystalline to both melt the PVOH and substantially eliminate the crystallinity in the PVOH melt while simultaneously removing energy from the PVOH melt at a rate sufficient to avoid decomposition of the PVOH melt. The melt is then extruded, preferably into a strand, rapidly cooled and cut into pellets, blended with the thermoplastic PEO and melt extruded, preferably into pellets for subsequent thermoprocessing into the desired product or article.

If the thermoplastic PEO is initially blended with a PVOH, a melt extrudable composition of the PVOH/PEO blend is obtained by providing sufficient energy to the PVOH/PEO blend both to melt the PVOH and the PEO and to substantially eliminate the PVOH crystallinity in the melt while simultaneously removing energy from the PVOH/PEO melt at a rate sufficient to avoid decomposition of the PVOH and the PEO. The melt is then processed directly into the desired product or article, or extruded into a strand, rapidly cooled and cut into pellets for subsequent thermoprocessing.

When the thermoplastic (melt extrudable) PVOH is prepared for subsequent blending and melt extruding with the PEO, the energy input utilized in this aspect of the process is at least about 0.27 KW hr/kg PVOH, and desirably less than 0.6 KW hr/kg PVOH, preferably 0.3 to 0.45 KW hr/kg PVOH. Additional energy is then required to melt extrude the PVOH/PEO blend. By separating the melt compounding from the shaping operation one can obtain an extrudable PVOH/PEO pellet that subsequently can be shaped into films, sheets, articles, especially bottles, and the like that exhibit little polymer decomposition or gels, and show improved pH stability and salt solution solubility.

According to the present invention, the necessary energy is added to melt the PVOH and the PEO, if present, and additional energy is added to shear the areas of PVOH crystallinity, while at the same time removing this shearing energy to prevent the melt temperature from exceeding the PVOH decomposition temperature. That is to say, the additional energy added to effect the shearing essentially passes through the resin melt eliminating the crystallinity and is removed by simultaneously cooling the melt, for example via the cooling jacket of the extruder.

The extruder requires intensive mixing elements to provide the requisite shearing energy. The shearing energy generated in a particular zone of the extruder should not be greater than that which can be removed by cooling; otherwise decomposition results.

In contrast to the very poor thermal stability of the precursor PEO resin which can lose its properties upon exposure to high temperatures for extended periods, the PVOH/PEO pellets produced are thermally stable and can withstand subsequent melt processing in conventional thermoplastic processing equipment, for example, a single screw extruder. The pellets can be thermoplastically processed (extruded) into essentially gel-free articles without decomposition because the equipment only has to melt the pellets (PVOH crystallinity having been greatly reduced) and generate sufficient pressure for the desired forming operation. These operations include, by way of example, extrusion, injection molding, thermoforming, injection blow molding, and tubular film blowing, all well-known in the art.

The PVOH/PEO composition is especially suitable for the production of water soluble containers. These containers can be produced by injection molding, blow molding, or profile extrusion, i.e. molding processes well-known in the art.

In addition, the PVOH/PEO composition can be used as a layer or layers in combination with other polymeric layers in multilayer films For example, the PVOH/PEO blend can be coextruded with one or more layers of polyolefin such as polyethylene. These multilayer structures are suitable for packaging applications. The manufacture of such multilayer structures, in particular films, is well-known in the art.

A preferred multilayer structure, especially a multilayer film, consists essentially of:

(1) a first layer of a partially hydrolyzed or a fully hydrolyzed thermoplastic PVOH, and (2) a second layer of the melt extrudable PVOH/PEO blend according to the present invention.

DETAILED DESCRIPTION OF THE INVENTION

Suitable PVOH's for use in the preparation of the extrudable PVOH/PEO composition and thermoplastic pellets include PVOH which is 75–99+ mole % hydrolyzed, preferably 85–98+ mole % hydrolyzed, and possesses a degree of polymerization (DPn) in the range of 200 to 2500, i.e., solution viscosities of 3 to 55 cps at 20° C. as a 4% aqueous solution. Copolymers of vinyl alcohol and methyl methacrylate consisting of 94–98 mole % vinyl alcohol and 2–6 wt % methyl methacrylate as disclosed in U.S. Pat. No. 3,689,469 are considered suitable equivalents to the vinyl alcohol and vinyl acetate copolymer containing the same mole % acetate units. The PVOH may also contain up to 3–5 mole % of a copolymerized monomer.

The PVOH component of the PVOH/PEO composition preferably comprises 30 to 95 wt %, most desirably 40 to 75 wt %.

The thermoplastic PEO suitable for use in the present invention are those polymers comprising polymerized EO units with an average molecular weight from about 100,000 to about 2 million, preferably an average molecular weight between 100,000 and 500,000. Since conventional PEO's are prepared by reacting a base polyol or water with ethylene oxide, it is contemplated that including other alkylene oxides such as propylene or butylene oxide with the ethylene oxide to provide random or block copolymers is within the scope of the invention provided the resulting polymer contains at least 40 wt % ethylene oxide units. PEO's that are essentially homopolymers are preferred. Suitable thermoplastic PEO's are available from Union Carbide under the trademark "Polyox", such as Polyox WRSN-80, WRPA-3154 and WRPA-5769 which having melt temperature around 65° C. It is preferred to use about 5 to 70 wt % and most desirably 25 to 60 wt % of the thermoplastic PEO A plasticizer is used to improve the flow characteristics of the PVOH. The plasticizer should be compatible with the PVOH and may be a polyhydric alcohol, most preferably glycerol, polyethylene glycol or other hydrophilic compounds known in the art to possess compatibility with the PVOH. Other plasticizers useful in the invention include hydrophilic plasticizers such as ethylene glycol, diethylene glycol, trimethylol propane, mannitol, pentaerythritol or other polyhydric low molecular weight alcohols, block copolymers of ethylene oxide and propylene oxide, non-hydroxylic plasticizers such as aromatic amides and aromatic sulfonamides, and others known to those skilled in the art. The preferred plasticizers are those that have multiple hydroxyl functionality, i.e. polyols. The amount of the plasticizer or blends of plasticizers added to the composition ranges from 1 to 30 wt %, preferably 3 to 20 wt %, and most preferably 5 to 15 wt %, based on PVOH.

The thermal stability of the PVOH can further be improved through the addition of small amounts of a mineral acid, preferably phosphoric acid, to a high intensity mixer in which PVOH and plasticizer may be blended prior to extrusion.

The PVOH should either be low in residual ash (sodium acetate measured as $Na_2O$) or treated with the neutralizing mineral acid.

Optionally, but advantageously, a dispersing agent such as glycerol mono-oleate (GMO) is added during the mixing operation. The preferred range of GMO or other dispersing agents added during the high intensity mixing is 0.05 wt % to 1.0 wt %, or more preferred 0.1 to 0.5 wt %.

In addition, it will be understood that various additives such as fillers, pigments, stabilizers, other thermoplastic resins and the like may be added to the PVOH/PEO composition of this invention without departing from its scope.

U.S. Pat. No. 5,051,222, which is hereby incorporated by reference, teaches a method for making melt extrudable (thermoplastic) PVOH compositions suitable for use in the present invention. The method comprises providing sufficient energy to a PVOH which is at least partially crystalline to both melt the PVOH and substantially eliminate the crystallinity in the PVOH melt while simultaneously removing energy from the PVOH melt at a rate sufficient to avoid decomposition of the PVOH melt. The melt is then extruded, preferably into a strand, rapidly cooled and cut into pellets. Such thermoplastic pellets are marketed by Air Products and Chemicals, Inc. under the trademark VINEX.

In the following description of the process for making a melt extrudable PVOH/PEO composition according to the invention, it will be understood that any reference to PVOH in preparing melt extrudable PVOH pellets (according to U.S. Pat. No. 5,051,222) for melt blending with the thermoplastic PEO would also apply to the direct preparation of the melt extrudable PVOH/PEO blend.

The PVOH/PEO compositions are prepared either directly by melt blending a PVOH composition containing plasticizer with a thermoplastic PEO in a high intensity extruder similarly to U.S. Pat. No. 5,051,222 or indirectly by first preparing melt extruded pellets of the plasticized PVOH blend in a suitable high intensity extruder according to U.S. Pat. No. 5,051,222, and then melt blending with the PEO to make pellets of the PVOH/PEO composition which then may be converted to the desired extruded article by an appropriate extruder.

The extruder used in the melt compounding of the PVOH, plasticizer, and optionally PEO, must be able to provide an energy input of at least about 0.27 KW hr/kg, preferably 0.35–0.45 Kw hr/kg, to the PVOH. The energy required to melt process the PEO from ambient temperature to the forming temperature is typically less than ~0.08 KW hr/kg PEO. Since this amount is less than the energy requirements per kg of PVOH, minimal changes in the process conditions for PVOH are necessary. The energy input for melting the PVOH (and PEO) may be heat or mechanical energy but with most suitable extruders will be all mechanical energy as will be the shearing energy.

The upper, practical limit of energy input would be about 0.6 KW hr/kg because any energy beyond that necessary to melt the PVOH (and PEO if present) and to eliminate PVOH crystallinity must be removed as "waste energy". The more energy that passes through the PVOH and has to be removed the more inefficient the process. Approximately 0.1 to 0.15 KW hr/kg is required to melt (and heat) the PVOH and about 0.2 to 0.3 KW hr/kg is needed to shear the crystalline PVOH areas in the melt.

Further, the extruder must be capable of removing the excess energy input not required in the heating, melting and shearing of the PVOH resin. The excess energy is removed through the extruder barrel, extruder screw, or through the evaporation of plasticizer during the devolatilization step. Examples of suitable commercially available extruders include Werner and Pfleiderer twin screw extruders and kneader-extruders such as the Buss kneaders.

The first step in a preferred method (indirect) for making extrudable PVOH/PEO compositions involves the preparation of PVOH blended with a dispersing agent to produce a granular, free flowing mixture to be fed into a melt compounding extruder. The blend is prepared using a variable speed high intensity mixer equipped with a cooling jacket. PVOH is charged to the mixer and the temperature is allowed to rise to approximately 55.C before the glycerol mono-oleate is added to the mixing vessel. Next the liquid plasticizer (glycerol) is injected into the mixing chamber under pressure through a spray nozzle once 70.C is reached. The nozzle serves to atomize the plasticizer and eliminates lumping of the PVOH. During the addition of the plasticizer, both the cooling jacket temperature and the mixer speed are adjusted to maintain the temperature of the mix below 105.C, preferably near 95.C. Advantageously, the required amount of mineral acid, preferably phosphoric acid, is mixed with the plasticizer in a liquid blend.

Other solid or liquid additives, pigments, fillers or stabilizers can be added once the plasticizer addition is complete. The mixing action is continued until a free flowing homogeneous product is achieved. This is generally 4–10 minutes but can vary depending upon the addition rate of the glycerol and the Tg of the PVOH polymer. After a free flowing mix is produced, it is discharged into a cooling blender and the temperature reduced to 30.C. The product is ready for extrusion compounding.

Rather than performing a premixing step, it is more desirable to directly inject the plasticizer (glycerol), mineral acid ($H_3PO_4$) and dispersing agent (glycerol mono-oleate) into the extruder at about the 3 diameter distance downstream from the feed location using the first diameters to heat up the PVOH. Thus, the additives are blended into the PVOH which is then quickly melted, sheared and extruded, avoiding a more prolonged exposure to high heat in a premixer.

The preferred extruder is capable of achieving a high level of mechanical energy input, uniformly distributed throughout the polymer. The mechanical energy input of the screw extruder can be quantified by measuring the specific energy. The specific energy input of a screw extruder is computed from the ratio of the electrical energy, in kilowatts (KW), of the screw mechanical drive to the throughput rate of the polymer (kg/hr). The preferred specific, or mechanical, energy input for the preparation of a homogeneous PVOH melt is greater than about 0.30 KW hr/kg. The extruder must also have cooling capabilities, most preferably jacketing in the barrel sections for heat transfer oil or water. The preferred temperature profile of the PVOH obtained in the different extruder zones is 150°–230° C. depending upon the grade of PVOH, most preferred 170°–220° C. Temperatures less than this result in the appearance of unmelted particles in the strands from the extruder outlet, while temperatures above this range increase the number of gels in the strand and promote degradation of the polymer at the barrel walls.

The PVOH pellets are blended with the PEO by conventional dry blending methods such as drum tumbling or ribbon blenders and then melt extruded, or simply melt blended with the PEO in a conventional single or twin screw extruder.

The PVOH/PEO compositions of the present invention in the following examples were prepared either by melt blending a PVOH composition containing plasticizer and phosphoric acid with PEO in a 46 mm reciprocating, rotating Buss kneader or by first preparing pellets of the melt extrudable PVOH blend containing the plasticizer and phosphoric acid in a suitable extruder and then melt blending with the PEO in single or twin screw extruders. The pellets of the PVOH/PEO composition were then converted to a single layer film by a single screw extruder equipped with a coathanger flat die having a 5.08 cm flat slit with a 20 mil gap. The temperatures along the barrel varied from 140° to 215° C. The extruded films were tested for various physical and mechanical properties.

Alkaline Resistance (accelerated test): The long term alkaline stability of PVOH/PEO blend films was measured by securing the film (15 mil; 3×4.5 cm) in the frame of a 35 mm format slide. The frame was then placed in a saturated aqueous NaCl solution (pH adjusted to about 12 with NaOH) for 2 and 4 hours simulating in 2 and 4 hours the effect of actual storage for one and two weeks, respectively, at 32° C. and 85% R.H. These films were then removed from the alkaline salt solution wiping off any solution adhering to the film. The wiped film was then placed in a beaker containing 200 ml of 35° C. water and agitated by a magnetic stirrer at a speed sufficient to result in a vortex. The time required for the breakup of the film and its complete dissolution was recorded.

Salt Stability: The salt stability of PVOH/PEO blend film was measured by securing the film (15 mil; 3×4.5 cm) to a 35 mm format slide. The film was then placed in a beaker containing 200 ml of an aqueous 10-15 wt % NaCl solution and agitated by a magnetic stirrer at a speed sufficient to result in a vortex. The time required for breakup of the film was recorded.

In the following examples all parts are parts by weight.

EXAMPLE 1

This Example demonstrates the simultaneous blending of PEO with PVOH while removing the crystallinity of PVOH through extrusion compounding with plasticizer.

Two blends of two different molecular weight PVOH's were made in a 400 liter high intensity mixer. The PVOH was loaded into the mixer and the mixer was started at high speed. When the blend material temperature reached 45° C., glycerol mono-oleate (GMO) was added as a dispersing agent to reduce lumping of the PVOH. At 50° C., glycerine blended with the appropriate amount of phosphoric acid (1:1 mole ratio with residual sodium acetate in the PVOH) was slowly added to the system until all was absorbed and the blend was free flowing. At this point, the material was discharged into a cooling blender to reduce the temperature to 30° C. Both blends were loaded into volumetric screw feeders and the feed rate of the product was calibrated as a function of the feeder speed. The blend compositions were:

|  | AIRVOL 205[a] BLEND | AIRVOL 523[b] BLEND |
|---|---|---|
| PVOH | 113.6 kg | 113.6 kg |
| GLYCERINE | 3.9 kg | 3.9 kg |
| GMO | 0.12 kg | 0.12 kg |
| $H_3PO_4$ (85%) | 0.68 kg | 0.24 kg |

[a]PVOH from Air Products and Chemicals, Inc. (87-89 mole % hydrolyzed; DPn = 550)
[b]PVOH from Air Products and Chemicals, Inc. (87-89 mole % hydrolyzed; DPn = 1300)

A third volumetric feeder was loaded with POLYOX WSRN-80 resin (Union Carbide Corp.) and similarly calibrated. The Airvol 523 blend was fed into the feed throat of a Buss 46 mm kneader extruder 11 diameters long. The Airvol 205 blend and the POLYOX resin were fed into a downstream opening in the extruder located 3 diameters down the barrel. Liquid glycerine was pumped into two locations, the first location was located two diameters downstream from the feed throat while the second liquid feed port was located five diameters downstream. A gear pump discharge into a six hole strand die was used to shape the strands and control the back pressure on the extruder. The strands were cooled by passing them over a series of water chilled rolls and then were cut into pellets for subsequent processing. A total of four compositions were produced with relevant processing conditions shown in Table 1.

TABLE 1

|  | COMP 1 | COMP 2 | COMP 3 | COMP 4 |
|---|---|---|---|---|
| 205 Blend feed rate (kg/hr) | 14.6 | 13.9 | 13.1 | 12.1 |
| 523 Blend feed rate (kg/hr) | 3.6 | 3.5 | 3.3 | 3.0 |
| POLYOX feed rate (kg/hr) | 1.1 | 2.2 | 3.4 | 4.5 |
| 1st glycerine port feed rate (kg/hr) | 0.9 | 0.9 | 0.9 | 0.9 |
| 2nd glycerine port feed rate (kg/hr) | 1.7 | 1.8 | 1.8 | 1.8 |
| Screw Temp (°C.) | 175 | 185 | 195 | 199 |
| Barrel Zone 1 Temp (°C.) | 190 | 185 | 195 | 204 |
| Barrel Zone 2 Temp (°C.) | 150 | 170 | 185 | 184 |
| Melt Pump Temp (°C.) | 185 | 195 | 204 | 205 |
| Die Temp (°C.) | 186 | 195 | 205 | 207 |
| Melt Temp (°C.) | 210 | 212 | 212 | 215 |
| Screw Speed (RPM) | 315 | 315 | 315 | 315 |
| Motor Load (KW) | 7.5 | 6.5 | 6.0 | 5.7 |
| Die Pressure (kPa) | 3,137 | 3,172 | 3,488 | 3,585 |
| Melt Flow 230° C./2.16 Kg) | 5.1 | 2.1 | 0.5 | 0.3 |
| Comments | a | b | c | d |

[a]Smooth strand; white color.
[b]Rough surface on strand; some surging.
[c]Higher surging; Rough strand.
[d]Considerable surging; very rough strand

EXAMPLE 2

The four compositions from Example 1 were extrusion cast into a thin film by using a 1" (2.54 cm) Killion single crew extruder. The extruder screw was a 24:1 L/D with 3:1 compression ratio screw. The operating parameters are shown in Table 2.

TABLE 2

|  | COMP 1 | COMP 2 | COMP 3 | COMP 4 |
|---|---|---|---|---|
| % PEO | 5 | 10 | 15 | 20 |
| ZONE 1 (°C.) | 200 | 200 | 205 | 205 |
| ZONE 2 (°C.) | 205 | 205 | 205 | 205 |
| ZONE 3 (°C.) | 205 | 205 | 205 | 205 |

TABLE 2-continued

|  | COMP 1 | COMP 2 | COMP 3 | COMP 4 |
|---|---|---|---|---|
| DIE ZONE (°C.) | 205 | 205 | 205 | 205 |
| SCREW SPEED (RPM) | 55 | 55 | 71 | 72 |
| DRIVE (AMPS) | 6 | 4 | 6 | 4.5 |
| DIE PRESS (kPa) | 9860 | 9308 | 6895 | 6895 |
| COMMENTS | a | b | c | d |

[a] Slightly hazy film, smooth.
[b] Nice film, slightly more hazy.
[c] Still more haze, start of grainy film.
[d] Rough film with high haze.

EXAMPLE 3

This example shows the preparation of melt extrudable PVOH pellets identified in the following examples as Vinex° 2025 PVOH resin in which it is melt blended with thermoplastic PEO.

Ninety parts of Airvol 205 PVOH with an ash content of about 0.45% was introduced into a high intensity Littleford 180L mixer and the mixer started at 900 rpm. When the material temperature reached 65° C., a liquid mixture consisting of 9.0 parts of glycerol and 0.62 parts of 85% phosphoric acid was added to the mixture while simultaneously reducing the mixer speed to 450 rpm. Cooling water was added to the mixer jacket and controlled to maintain the product temperature below 100° C. at all times. After the glycerol addition was completed, the PVOH blend was mixed for five minutes until a free flowing blend was formed. The blend was then discharged into a Littleford 400L cooling mixer and the product temperature lowered to 40° C. The resulting mixture was free flowing and free of clumps or degraded material.

This blended PVOH composition was loaded into a volumetric feeder and fed into a 46 mm reciprocating, rotating Buss extruder. The screw was designed to achieve a high degree of mechanical energy input without product degradation. The extruder was a devolatilizing extruder, and a vacuum of 254 torr (10 in Hg) was applied at the vent port located at 7 diameters to remove any residual moisture in the polymer and acetic acid formed from the conversion of sodium acetate to disodium monohydrogen phosphate. The melt temperature of the polymer in the working zone of the extruder was maintained at the upper end of the polymer melting curve as indicated by a Differential Scanning Calorimeter (DSC). Melt temperatures were measured at 183° C., 197° C., and 199° C. Typical operating conditions are listed in Table 3 below.

The product exited the extruder and was immediately cooled below its glass transition temperature to prevent product degradation and crystallization o the polymer that would lead to gel formation during subsequent thermoforming operations. The strands were cut in a conventional manner into pellets and collected.

TABLE 3

| Screw Speed | 300 RPM |
|---|---|
| Screw Temperature | 140° C. |
| Barrel Temperatures | |
| 1st zone | 150° C. |
| 2nd zone | 150° C. |
| Production Rate | 21.7 kg/hr |
| Max. Melt Temp. | 201° C. |
| Screw Power | 6.5 KW |
| Specific Energy Input | 0.30 KW hr/kg |

The pellets produced were gel-free, smooth and had a straw color.

EXAMPLE 4

Pellets of Vinex TM 2025 PVOH prepared as in Example 3 were blended with powder form of POLYOX WRSN-80 PEO resin in the ratio of 90:10 and 80:20 PVOH:PEO. The pellets and powder were mixed in a closed container and were extrusion blended in a Haake twin screw extruder under the conditions shown in Table 4.

TABLE 4

|  | Blend C (10% PEO) | Blend D (20% PEO) |
|---|---|---|
| Zone 1 (°C.) | 185 | 185 |
| Zone 2 (°C.) | 210 | 210 |
| Zone 3 (°C.) | 165 | 165 |
| Die Temp (°C.) | 160 | 160 |
| Melt Temp (°C.) | 206 | 207 |
| Feed Rate (kg/hr) | 3.1 | 3.4 |
| Torque (m-grams) | 2050 | 2500 |
| Screw Speed (RPM) | 245 | 245 |

Both samples produces strands that were milky white and smooth.

EXAMPLE 5

Airvol 205 PVOH (9.07 kg) was placed in a 50 liter Henschel high intensity mixer and heated to 60° C. at high speed. GMO (45 g) was then added along with a blend of glycerol (1.37 kg) and phosphoric acid (79 g). The mixture was kept below 95° C. and blended until a free flowing powder was obtained. The PVOH blend was discharged into a low intensity ribbon blender cooler where 10.57 kg (50 wt %) Polyox WRSN-80 resin was added and blended.

The mixture was metered into a C. W. Brabender conical twin screw extruder with a volumetric accurate feeder. The extruder was water cooled and had three heating zones plus a die. The operating parameters are shown below in Table 5.

TABLE 5

| Zone 1 (°C.) | 145 |
|---|---|
| Zone 2 (°C.) | 185 |
| Zone 3 (°C.) | 165 |
| Die Temp (°C.) | 180 |
| Melt Temp (°C.) | 172 |
| Feed Rate (kg/hr) | 2.7 |
| Torque (N-meters) | 120 |
| Screw Speed (RPM) | 60 |

The strands were milky white and smooth.

EXAMPLE 6

Vinex 2019 resin (a thermoplastic PVOH consisting of 89.5% Airvol 205 PVOH, 0.5% GMO and 10% glycerol) was loaded into a volumetric screw feeder and the feed rate calibrated as a function of screw speed. A second volumetric feeder was loaded with Polyox WSRN-80 resin and similarly calibrated. The Vinex 2019 resin was fed downstream 3 diameters into a Buss 46 mm kneader extruder 11 diameters long. The Polyox resin was also fed into the downstream opening in the extruder. An atmospheric vent was located 7 diameters down the extruder to vent any residual moisture. A gear pump discharge into a 6 hole strand die was used to shape the strands and control the back pressure on the extruder. The strands were cooled by passing them over a series of water chilled rolls and then were cut into pellets for subsequent processing. The operating parameters are shown below in Table 6.

TABLE 6

| | |
|---|---|
| Vinex 2019 (kg/hr) | 9.1 |
| Polyox WSRN-80 (kg/hr) | 9.1 |
| Screw Temp (°C.) | 180 |
| Barrel Zone 1 Temp (°C.) | 140 |
| Barrel Zone 2 Temp (°C.) | 180 |
| Melt Pump Temp (°C.) | 180 |
| Die Temp (°C.) | 180 |
| Melt Temp (°C.) | 179 |
| Screw Speed (RPM) | 303 |
| Motor Load (kW) | 4.25 |
| Die Pressure (kPa) | 2206 |

EXAMPLE 7

The extruded PVOH/PEO blends of Examples 5 and 6 were extrusion blown into a thin film by using a one inch (2.54 cm) Killion single screw extruder using the operating parameters shown below in Table 7. The extruder screw was 24:1 L/D with a 3:1 compression ratio.

TABLE 7

| | Comp 7A | Comp 7B |
|---|---|---|
| PVOH/PEO Blend | Ex 5 | Ex 6 |
| ZONE 1 (°C.) | 185 | 185 |
| ZONE 2 (°C.) | 180 | 205 |
| ZONE 3 (°C.) | 175 | 200 |
| DIE ZONE (°C.) | 175 | 195 |
| SCREW SPEED (RPM) | 73 | 90 |
| DRIVE (AMPS) | 11 | 10 |
| DIE PRESSURE (kPa) | 21,375 | 14,961 |

The films of each of Compositions 7A and 7B were milky white and smooth.

EXAMPLE 8

Samples of Vinex 2025 resin film and Example 7A film at 1.5 mil thickness were evaluated according to the alkaline resistance test. The times for breakup and dissolution are shown in Table 8. The results indicate that films of the PVOH/PEO blends can be used for packaging highly alkaline material without affecting the solubility of the PVOH.

TABLE 8

| Film | Breakup (sec) | Total Sol. (min) |
|---|---|---|
| Vinex 2025 | 150 | after 10 min large piece remained undissolved |
| Example 7A | 60 | 3 |

EXAMPLE 9

Films of Vinex 2019 resin and Example 7B resin at 15 mils were evaluated according to the salt stability test. The times for breakup of the films are shown in Table 9. The results indicate that films of the PVOH/PEO blend can be used as a carrier for delivering additives to salt water media where extruded PVOH film remains undissolved for long periods.

TABLE 9

| Film | Breakup (min) |
|---|---|
| Vinex 2019 | 180 |
| Example 7B | 20 |

STATEMENT OF INDUSTRIAL APPLICATION

The present invention provides an extrudable polyvinyl alcohol/polyethylene oxide composition useful for packaging and handling applications.

We claim:

1. In a melt extrudable composition consisting essentially of melt extrudable polyvinyl alcohol and 1-30 wt % plasticizer, based on polyvinyl alcohol, which has been made melt extrudable by adding sufficient energy to the polyvinyl alcohol to both melt it and substantially eliminate the crystallinity in the melt while simultaneously removing energy from the melt at a rate sufficient to avoid decomposition of the polyvinyl alcohol, the improvement which comprises 5-95 wt % thermoplastic polyethylene oxide, based on polyvinyl alcohol, the polyethylene oxide having an average molecular weight from 100,000 to 2,000,000.

2. The composition of claim 1 in which the polyethylene oxide has an average molecular weight of 100,000 to 500,000.

3. The composition of claim 1 in which the polyethylene oxide contains at least 40 wt % ethylene oxide units.

4. The composition of claim 1 in which the polyethylene oxide is a homopolymer.

5. The composition of claim 1 in which the polyethylene oxide has a melt temperature of about 65° C.

6. In a melt extrudable composition consisting essentially of melt extrudable 75 to 99+ mole % hydrolyzed polyvinyl alcohol and 3-20 wt % plasticizer, based on polyvinyl alcohol, which has been made melt extrudable by adding about 0.3 to 0.6 KW hr/kg to the polyvinyl alcohol to both melt it and substantially eliminate the crystallinity in the melt while simultaneously removing energy from the melt at a rate sufficient to avoid decomposition of the polyvinyl alcohol, the improvement which comprises 5-70 wt % thermoplastic polyethylene oxide which has an average molecular weight from 100,000 to 500,000.

7. The composition of claim 6 in which the polyethylene oxide contains at least 40 wt % ethylene oxide units.

8. The composition of claim 6 in which the polyethylene oxide has a melt temperature of about 65° C.

9. In a melt extrudable composition consisting essentially of melt extrudable 85 to 98+mole % hydrolyzed polyvinyl alcohol and 5-15 wt % plasticizer, based on polyvinyl alcohol, which has been made melt extrudable by adding about 0.35 to 0.45 KW hr/kg to the polyvinyl alcohol to both melt it and substantially eliminate the crystallinity in the melt while simultaneously removing energy from the melt at a rate sufficient to avoid decomposition of the polyvinyl alcohol, the improvement which comprises 25-60 wt % thermoplastic polyethylene oxide which has an average molecular weight from 100,000 to 500,000.

10. The composition of claim 9 in which the polyethylene oxide is a homopolymer.

11. The composition of claim 10 in which the polyethylene oxide has a melt temperature of about 65° C.

12. In a method for making a melt extruded polyvinyl alcohol article which comprises
    (a) adding sufficient energy to a mixture of a plasticizer and a polyvinyl alcohol which is at least partially crystalline to both melt the polyvinyl alcohol and substantially eliminate the polyvinyl alcohol crystallinity in the melt, (b) simultaneously removing energy form the melt at a rate sufficient to avoid decomposition of the polyvinyl alcohol, and (c) extruding the mixture to form an article, the improvement which comprises adding a thermoplastic polyethylene oxide to the polyvinyl alcohol/plasticizer mixture, the polyethylene oxide having an average molecular weight from 100,000 to 2,000,000.

13. The method of claim 12 in which the polyethylene oxide is added to the polyvinyl alcohol/plasticizer mixture prior to step (a).

14. The method of claim 12 in which the polyethylene oxide is added to the polyvinyl alcohol/plasticizer mixture during step (a).

15. The method of claim 12 in which the polyethylene oxide has an average molecular weight of 100,000 to 500,000.

16. The method of claim 12 in which the polyethylene oxide contains at least 40 wt % ethylene oxide units.

17. The method of claim 12 in which the polyethylene oxide is a homopolymer.

18. The method of claim 17 in which the polyethylene oxide has a melt temperature of about 65° C.

19. In a method for making a melt extruded polyvinyl alcohol article which comprises (a) adding 0.27 to 0.6 KW hr/kg to a mixture of a plasticizer and a 85-99+ mole % hydrolyzed polyvinyl alcohol which is at least partially crystalline to both melt the polyvinyl alcohol and substantially eliminate the polyvinyl alcohol crystallinity in the melt, (b) simultaneously removing energy from the melt at a rate sufficient to avoid decomposition of the polyvinyl alcohol, and (c) extruding the mixture to form an article, the improvement which comprises adding a thermoplastic polyethylene oxide having an average molecular weight from 100,000 to 500,000 to the polyvinyl alcohol/plasticizer mixture.

20. The method of claim 19 in which the polyethylene oxide is added to the polyvinyl alcohol/plasticizer mixture prior to step (a).

21. The method of claim 19 in which the polyethylene oxide is added to the polyvinyl alcohol/plasticizer mixture during step (a).

* * * * *